Figure 1:
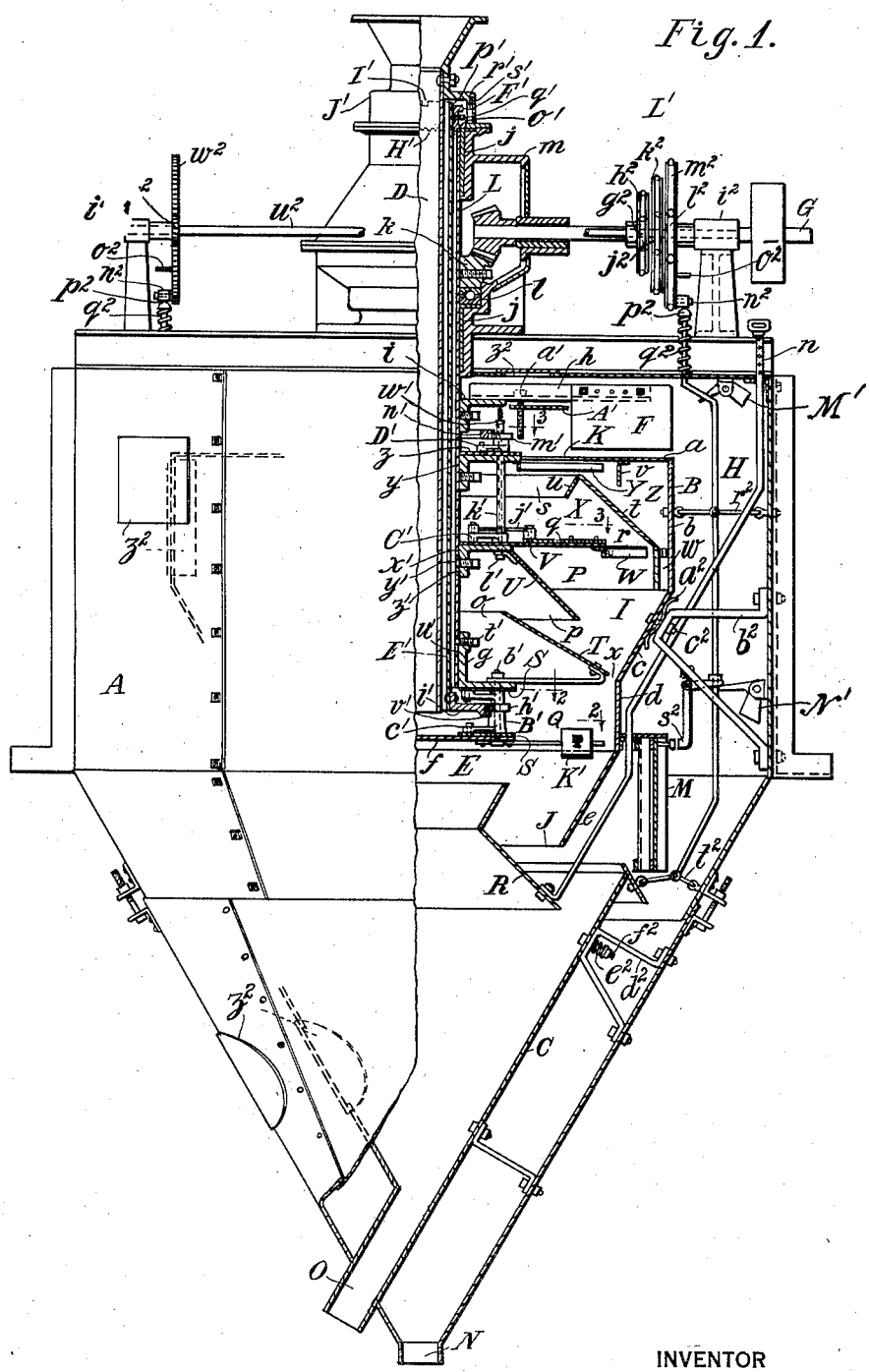

Feb. 28, 1939. G. H. FRASER 2,148,452

AIR AND OTHER SEPARATORS

Original Filed Dec. 31, 1931 3 Sheets-Sheet 1

INVENTOR
George Holt Fraser

Feb. 28, 1939.　　　G. H. FRASER　　　2,148,452
AIR AND OTHER SEPARATORS
Original Filed Dec. 31, 1931　　3 Sheets—Sheet 2

INVENTOR:
George Holt Fraser

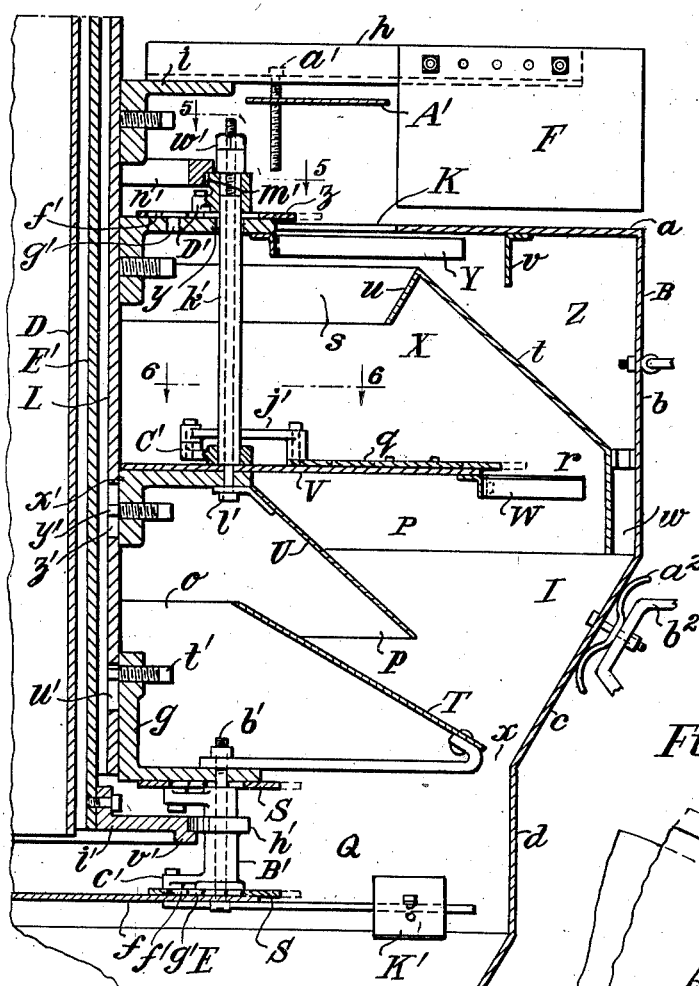
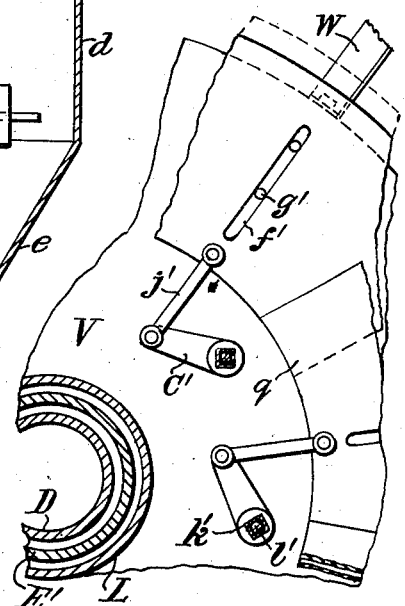
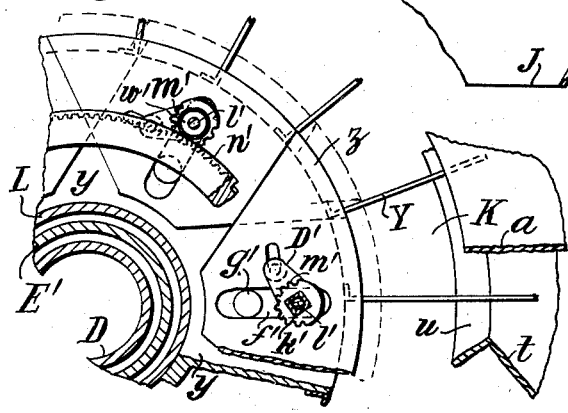

Patented Feb. 28, 1939

2,148,452

UNITED STATES PATENT OFFICE 2,148,452

AIR AND OTHER SEPARATORS

George Holt Fraser, Brooklyn, N. Y.

Application December 31, 1931, Serial No. 584,140
Renewed October 6, 1936

15 Claims. (Cl. 209—139)

This invention relates to separators of the type in which a fluid current is circulated in the form of a vortex ring up through an inner separating chamber and down through an outer settling chamber for separating fine material and floating it into the settling chamber and dropping coarse material from the separating chamber, and aims to provide improvements especially applicable to such separators.

This application relates to separators of the types shown in my issued Patents Nos. 1,542,050 dated June 16, 1925; 1,834,095 dated Dec. 1, 1931; 1,876,516 dated Sept. 6, 1932; 1,987,615 dated Jan. 15, 1935, and 2,055,484 and 2,055,485 dated Sept. 29, 1936.

My present invention aims to improve the construction, arrangement and operation of such air separators, and especially of those in which the distributed material around a distributor is uptossed by circumferentially spaced rotary uptosser means; or in which particles are beaten from the separating current by circumferentially spaced rotary beaters having between them spaces or passages for up-passing such current; or in which the velocity of such current is varied by a vertically adjustable rotary valve spaced above the separating chamber; on the principles set forth in my said patents.

Objects of my present invention are to facilitate control or variation of such up-tossing or beating; to effect said variation without requiring variation of the speed of rotation of said parts; to avoid molestation of said beaters by particles uptossed toward them; to sustain below said beaters and above said distributor, and to therebetween outwardly conduct around and without molestation from such current, particles outbeaten from said current by said beaters, and to facilitate variation of the velocity of said current with minimized molestation of its flow above an upper outlet.

To this end, in carrying out the preferred form of my present improvements as applied to such separators, I preferably make their uptosser means radially adjustable relatively to the zone of distribution.

I vary the width of the uptossing space in which they rotate by disposing inwardly of them a rotary ring of segments having outer edges radially adjustable toward and from the uptossing means, for varying said width.

I vary the width of the uptossing passage above them by providing inwardly of and above them a rotary ring of segments having outer edges which are radially adjustable above and toward and from them, for varying the width of the space through which material may be uptossed from them into the separating chamber, and toward particle beaters when these are used therein.

I minimize molestation of such beaters by such uptossed particles by providing an annular uptossed material interceptor well above said uptossers and below said beaters, for deflecting said current and intercepting said particles therebetween.

I control or vary said beating by providing said beaters with a rotary ring of segments inwardly thereof and having outer edges circumferentially extended across the spaces affording upward passages for said current between said beaters, and make said edges radially adjustable over said passages, for varying the effective size thereof and the beating therein.

I sustain and outwardly convey below and adjacent said beaters particles outbeaten thereby, by providing within said separating chamber an annular partition having an inner periphery above the distributor and below and adjacent the beaters and around the upward current passage and transversely outwardly extending therefrom, for receiving and outwardly conducting around said periphery said particles without molestation from said current.

I radially vary the inner periphery of the upper outlet by providing inwardly thereof a rotary ring of segments having outer edges defining said periphery and radially adjustable for radially varying it, and having rotary adjustment means disposed inwardly of it.

Figure 2:
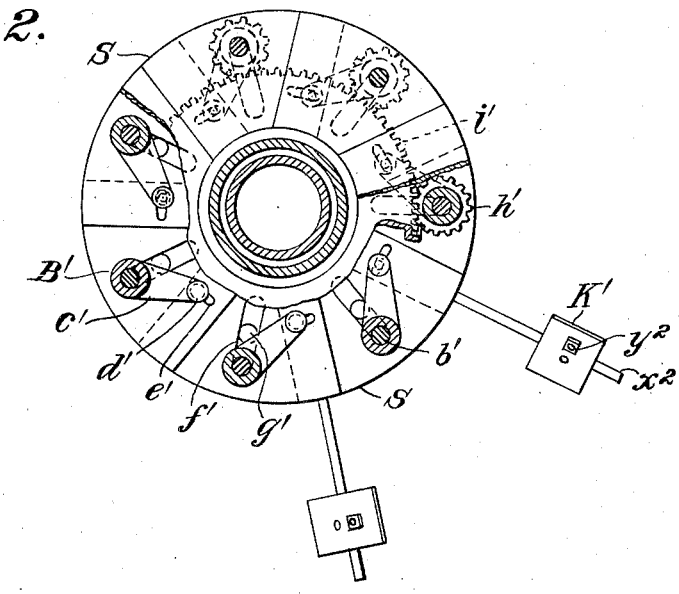
Figure 3:
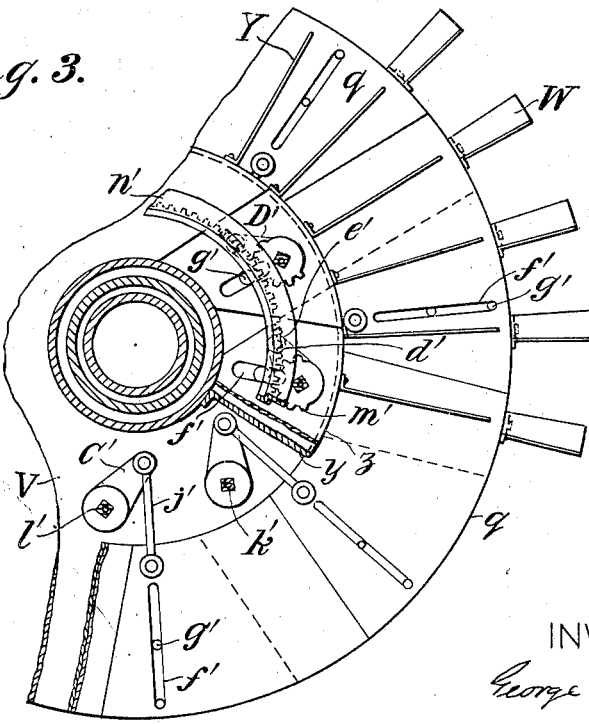

For varying the velocity of said current with minimum molestation thereof I preferably suspend the rotary valve above the upper outlet and below the spoke means, and provide adjustment means above it and suspending it from the spoke means, for adjusting it with minimum molestation of the current flowing below it from the outlet to the fan blades, and I provide various other features of improvement, all of which will be hereinafter more fully set forth with reference to the accompanying drawings, in which Fig. 1 is a side elevation partly in vertical axial section showing the preferred form of my present improvements as applied to a vortex ring air separator;

Fig. 2 is an enlarged fragmentary horizontal section, cut in part immediately below the hub or ring member above the distributor, and in part between such upper member and the distributor, and showing the latter in plane, the upper portion of the view being cut approximately on the plane of the upper line 2, and the lower portion being cut approximately on the plane of the lower line 2, in Fig. 1, and Fig. 3 is an enlarged fragmentary plane view of the throat baffle and the selection chamber baffle, the upper part of the view being cut approximately on the plane of the upper line 3, and the lower part of the view being cut approximately on the plane of the lower line 3, in Fig. 1, the intermediate top wall of the separating chamber and of the grit well being omitted for clearness.

Fig. 4 is a fragmentary vertical axial section of that part of the separator below its top wall and above the return current inlet shown in section in Fig. 1, but showing the intermediate baffle adjusted downwardly from its position in Fig. 1, and showing the radially adjustable segments in a partially outwardly adjusted position in full lines and in a fully outwardly adjusted position in dotted lines, and showing the means for radially adjusting said segments and for vertically adjusting said baffle;

Fig. 5 is a fragmentary horizontal section thereof cut approximately on the lines 5—5 in Fig. 4, and showing the means for radially adjusting the segments of the inner upper valve, and Fig. 6 is a fragmentary horizontal cross section of Fig. 4, cut approximately on the line 6—6 thereof and showing the means for adjusting the radial segments of the intermediate baffle.

Referring to the drawings let A indicate the outer casing, B the inner casing, I the separating chamber, V the particle beaters therein, C the lower receptacle or tailings receiver, D the supply conduit or feed pipe, E the distributor, K' the material uptosser means therearound, K the upper outlet, A' the valve above the outlet, V the baffle within the separating chamber, F the blower, and G the drive or shaft of an air separator comprising features set forth in my said patents.

These parts may be of any usual or suitable construction for affording an outer settling chamber H and an inner separating chamber I having a lower peripheral inlet J and an upper current outlet K communicating with the outer chamber and affording an endless current passage up through, out over, down around, and returning in under the separating chamber, above the open upper end of the tailings cone C, and for supplying and distributing material to be separated within the separating chamber, and for causing a separating current to flow up through such material for separating and floating fine material into the settling chamber. The distributor and blower are usually rotary and mounted on a shaft as the tubular shaft L which is revolved by the drive G, and the air returning from the settling chamber is usually cleaned by fine material interceptor means as the filter M which usually consists of two rows of spaced staggered hollow troughs extended vertically across the return current passage with their hollow outer sides opposed to the direction of flow of the current for forming current voids in which particles floating in such current may precipitate and be conducted across and below the zone of the current as the latter curves between their spaced edges so that the fines may be discharged through the fine outlet N and the tailings through the coarse outlet O.

The casing A shown is cylindrical and conical and comprises detachably connected sectional curved side and flat top walls supported by suitable feet and detachably carrying a sectional conical bottom wall on which the tailings cone is mounted, the other parts of the separator being carried from the side and top walls.

The inner casing B shown comprises a flat top wall $a$ around the outlet K, a large diameter upper wall $b$, enclosing a selection chamber P, a converging middle wall $c$, a small diameter cylindrical wall $d$, enclosing a distribution chamber Q, and a converging bottom wall $e$ around the inlet J.

As shown the distributor E comprises a lower circular member or plate $f$, spaced under an upper ring or plate $g$, both of which are revolved by the shaft L, the lower plate being below and opposite the feed conduit for receiving and centrifugally distributing material descending through the latter.

The uptosser means K' usually comprises a rotary ring of circumferentially spaced radially fixed members radially extended across the space around the distributor E; the beater means Y usually comprises a rotary ring of circumferentially spaced members below and radially extended across the outlet K, and affording through the spaces between them passages for upflow of the current thereto, and the valve A' is usually a rotary valve vertically adjustable above and toward the outlet K.

The blower F shown comprises rotary fan blades adjustably mounted on spokes $h$ carried by a hub $i$ which is fixed to and revolves with the shaft L, which shaft is shown as tubular and mounted in upper and lower bearings $j$ and supported by a beveled gear $k$ fixed on the shaft and carried by a ball bearing $l$ mounted in the bearing case $m$.

The separator shown is shown as provided with a vertically adjustable conical valve R within and below the lower inlet J, for vertically and radially varying the annular space under and within this inlet through which the return current may flow, shown as suspended by an adjustable rod $n$ extending through the top of the casing and vertically adjusting said valve and indicating its position; this, however, is not essential to and forms no part of the improvements herein claimed.

The separator shown is shown as provided below the beaters Y with an additional rotary ring of circumferentially spaced beaters W, shown as inclinably adjustably mounted around the outer periphery of the baffle V and revoluble in and radially extended across the upward current passage $r$ therearound, but a succession of rings of rotary beaters is not essential to the improvements claimed herein and forms no part thereof.

The distributor E, and uptosser means K' are shown as vertically adjustable and vertically adjustably suspended from above the casing A; this, however, is not essential to improvements claimed herein and forms no part thereof.

The separator shown is shown as of the type having a non-rotary feed pipe D spaced within and concentric of, and extended through and open above and below, the distributor shaft L, in which the latter is a tubular shaft around the conduit; this, however, is not essential to the improvements claimed herein and forms no part thereof.

According to one feature of improvement, I preferably intercept and rotatably discharge below the selection chamber and the beaters Y, and above the uptossers K', particles uptossed by the latter from the distribution chamber Q, preferably by providing an annular upwardly and inwardly inclined, and preferably externally vertically adjusted, rotary deflector or baffle T, in the form of a truncated cone, above and opposite the uptossers K', and spaced from the wall $d$, and extended upwardly and inwardly around and spaced from the shaft L, to afford past the inner edge of said wall an inward upward current passage $o$ through which the current may flow into the inner portion of the selection chamber P, outwardly through which it must flow as it travels to the upper outlet, to afford an opportunity for precipitation during such outward flow, which baffle T is preferably above and extended laterally across the upward current passage around the distributor, and serves as a particle interceptor for intercepting coarse particles upflowing in said passage below the selection chamber, and for rotatably discharging such particles below the selection chamber, and when the distributor is provided with particle uptossers, as K', in the plane of its distribution, for upbeating the distributed particles toward the selection chamber, the baffle T is superposed and spaced above said uptosses, and affords a cover for them below the selection chamber and in the path of flow of the upbeaten material, for intercepting coarse upbeaten particles and for rotatably discharging them below the selection chamber.

According to another feature of improvement, I preferably intercept and rotatably discharge below the beaters Y, and above the uptossers K', uptossed particles floating in the current flowing toward said beaters, preferably by providing a rotary downwardly and outwardly inclined baffle wall or current lateral deflector U spaced below the beaters Y and above the distributor E, and extended laterally a substantial distance across the upward current passage above the uptossers K', preferably as a downwardly and outwardly inclined, and preferably externally vertically adjusted, downward current deflector U above the deflector T, for downwardly and outwardly deflecting current from the outlet $o$ toward the lower or outer part of the selection chamber P, and jetting such current downwardly around the latter by a contracted annular jet outlet $p$, so that the current must circulate downwardly in the lower part of and then upwardly in the outer part of the selected chamber.

According to another feature of improvement, I preferably radially vary the uptossing space inwardly of the uptosser means K', and around the distributor E, by providing around the lower plate $f$ of the latter a rotary ring of radially adjustable segments, preferably as flat overlapped segments S, preferably externally and collectively radially adjustable, and preferably slidably supported on the upper surface of the plate $f$ in such manner that they can be radially slid toward and from said uptosser means to vary the width of the uptossing space inwardly of the uptossers, and the space through which current may flow past the uptosser means.

According to another feature of improvement, I preferably vary the width of the passage above the distribution portion through which material may be uptossed by the uptosser means, for accomplishing which I preferably provide a ring of radially adjustable segments S above the distribution chamber and the zone of distribution, and spaced above the lower plate $f$, and preferably adjacent and around the upper plate or ring $g$ of the distributor, and above and inwardly of the uptosser means K' which segments can be radially adjusted relatively to the latter to radially vary said space, and are preferably externally and collectively radially adjusted, and are preferably succesively overlapped, and slidingly mounted on the under side of the upper ring $g$, so that the space through which said material may be uptossed from the distribution chamber Q into the selection chamber P can be varied.

According to another feature of improvement, I preferably make the uptosser means K' radially adjustable relatively to the zone of distribution, for radially varying the uptossing zone, preferably by providing below and opposite and covered by the inward baffle T, and radially outwardly of and around the outer periphery of the distributor E, covered rotary radially and angularly adjustable circumferentially spaced material uptossers K', reciprocal to the baffle T and revolving in, and preferably radially and inclinably adjustably spaced in, the space around the distributor E and opposite and below the inclined baffle T, for violently uptossing distributed material toward the latter, for agitating such material in the distribution chamber, to give the separating current access to any fines contained in the material, and to permit the baffle T to intercept coarser uptossed particles and to prevent them from being thrown into the selection chamber P by the violence with which they may be beaten upwardly by the uptossers K', which are preferably flat plates rotatively and adjustably mounted on round radial rods $x2$, carried by the distributor E, and clamped radially and angularly on these rods by screw clamps $y2$.

According to another feature of improvement, I preferably provide for radially varying the effective sizes of the circumferentially spaced passages through which such current may upflow between the beaters W, for varying the beating without requiring variation of the speed of rotation of the beaters, which I preferably accomplish by providing, inwardly of the beaters W, a rotary ring of radially adjustable segments $q$, having outer edges inwardly of and adjacent and extended circumferentially across said passages, and adjustable radially of the latter for radially varying the effective sizes thereof, which segments are preferably slidably or detachably mounted on the baffle V so that they may be adjusted to radially vary the outlet $r$ around the periphery of the baffle V and to define and vary the space past their outer edges through which current may upflow between the beaters W, and preferably have means as C' constructed to collectively radially adjust them from externally of the separating chamber.

As shown the beaters W are oscillatorily pivoted on the bolts fastening them to the baffle V to permit varying their inclination to that best suited to down-beating particles with the minimum of resistance to upflow of the current.

According to another feature of improvement, I preferably radially vary the effective sizes of the current passages between the circumferentially spaced beater means Y, which latter are shown as vertically disposed narrow rotary beaters within and in the plane of the upper outlet K, and immediately under the plane of and contiguous to the top wall $a$, extended across the upper outlet K and rotatable between the wall $y$ and the top wall $a$, for outbeating under and adjacent the latter particles floating in the current flowing past the inner edge thereof and through the upper outlet, preferably by providing inwardly of the beaters Y, and above the separating chamber and around the baffle y, a rotary ring of radially adjustable segments z, having outer edges circumferentially extended across the upward current passages between the beaters Y and adjustable radially of said passages for radially varying the effective sizes thereof and the velocity of the current flowing therethrough during said beating, for varying said beating without requiring variation of the speed of rotation of said beaters, which segments z are preferably collectively radially adjustable overlapped plates around the baffle y and having means, as D', for collectively radially adjusting them.

According to another feature of improvement, I preferably sustain and outwardly convey below and adjacent rotary outbeaters particles outbeaten thereby, and resist molestation by the separating current of such particles, preferably by providing an annular partition wall t below the beater means Y and above the distributor E, and between the selection chamber P and the outlet K, as a receiver sustain wall, for receiving and sustaining such outbeaten particles above the selection chamber and around the path of the separating current, and for conveying them outwardly of and discharging them around said path and resisting their return to said current, which partition preferably comprises an outwardly extended annular partition wall below and adjacent the beaters Y and within and around the separating chamber and between the selection chamber P and the outlet K, and is shown as comprising an inner outlet s under the upper outlet K, and an inwardly and upwardly inclined deflector wall t above the outlet r, and a downwardly and inwardly inclined inner periphery or deflector wall u around the outlet s, for deflecting the current inwardly and downwardly and then curving it upwardly immediately under said outlet, for precipitating particles which may have passed the beaters W, and is shown as affording above the latter and the baffle V, and below the inner periphery of the wall t, a substantial exhaust chamber X, and as an outward and downward conveyor wall for outbeaten particles, and as affording around the selection chamber a downward conduit w for precipitating such particles around the latter. The partition t preferably encloses the outer ends of the outbeaters Y, and provides a grit well or chamber Z around these ends and between the upper wall a and the selection and exhaust chambers, for receiving outbeaten particles and returning them to the distribution chamber by dropping them down the wall c, down which they may slide past the selection chamber, and through the space between the deflector T and the wall d, into the distribution chamber, and through this to the lower inlet J, and for intercepting outbeaten particles in the well Z, I preferably provide a check ring v, spaced outwardly of and around the ends of the beaters Y, for intercepting and precipitating such particles and for interrupting direct inward current flow toward the beaters, and to resist upflow of current through the well Z, should any rise through its grit duct w encircling the chamber P.

According to another feature of improvement, I preferably rotatably define and radially vary the inner periphery of the upper outlet K by providing inwardly thereof a rotary ring of radially adjustable segments z, having outer edges variably defining said periphery and radially adjustable for radially varying it, and having rotary adjustment means, as D', disposed inwardly of said periphery, which segments z are preferably above the separating chamber and the plane of the outlet K, and slidably mounted on the outwardly extended rotary annular inner baffle y, within and inwardly of and having an outer periphery spaced inwardly from and preferably vertically fixed and in the plane of the top wall a, for defining the inner periphery of the outlet K as an annular outlet in such plane and above an intermediate portion of the separating chamber, the outer periphery of which inwardly defines said outlet above an intermediate portion of the separating chamber, in such manner that the outer edges of the segments z may be adjusted from said periphery toward the inner edge of the top wall a, for radially varying above the separating chamber the size of the outlet K and the space through which current may flow therefrom, for varying the velocity of said current from inwardly of said inner periphery and said outlet.

According to another feature of improvement, I preferably provide for, from above the upper outlet, varying the velocity of the current outflowing therefrom, with minimum molestation thereof, by a rotary and vertically adjustable valve thereabove, preferably by suspending and adjusting the rotary valve A' above the upper outlet and below and from the spoke means a', and by providing adjustment means for it above it and suspended from the spoke means and disposed inwardly of the inner periphery of the outlet, in such manner as to cause minimum molestation to outflow of such current around said periphery and below said valve, for which I preferably provide a rotary outwardly extended dependent and preferably vertically adjustably suspended annular valve A' inwardly of the inner edges of the fan blades and spaced above the outlet, and adjustably spaced below and preferably adjustably depended from the fan spokes h, as by adjusting screws a' by which it can be vertically adusted toward and from the outlet K, to vary the influent chamber inwardly of the fan blades and below the spokes, to afford under this valve an uninterrupted spokeless current passage from the outlet to the inner edges of the fan blades in any adjustment of the valve, and to vary the current which the fan may blow into the settling chamber, to vary the fineness of separation. When the fan spokes are located at the upper edge of the blades the valve A' may be adjusted from against the spokes downwardly throughout most of the free height of the blades, thus giving it a wide range for control of the separating current. The valve A' in its outward extension may be of any suitable contour, but is preferably flat, and being rotary it will centrifugally outthrow dust tending to settle on it, and will centrifugally assist in the outflow of current below it.

In the separator shown the segments of the radially adjustable ring valves or dampers S, q and z are preferably adjusted from externally of the separating chamber, and are preferably detachably, adjustably or slidably mounted on the parts carrying them, and the segments of each are preferably collectively adjustable and are preferably adjusted by cam like oscillatory cranks, mechanically connected to insure their simultaneous uniform operation, preferably as shown, in which the crank B' for the lower slides is a tubular casting mounted between them around the adjustable bolt $b'$ which detachably connects the upper and lower plates of the distributor. As shown the lower slides S rest on the lower plate $f$ and the upper slides S are spaced above the lower plate $f$ and are adjacent or against the lower face of the distributor hub $g$, and the tubular body of the crank B' spaces these plates and holds them in position while its crank arms $c'$ have pins $d'$ engaging transverse slots $e'$ in the plates for sliding them when the cranks are oscillated, and the plates are radially guided by slots $f'$ engaging the corresponding screw $b'$ and a guide pin or stud $g'$, and the hub of each crank B' has a toothed collar or flange $h'$ meshing with a gear $i'$ by which all of the cranks may be oscillated together to uniformly simultaneously adjust their slides collectively for radially varying the space around them.

As shown each crank C' is preferably mounted on the baffle V and connected to its plate $q$ by a link $j'$, and is fixed on the lower end of a square tube $k'$ rotatively mounted on an adjusting suspension bolt $l'$ and extended up through and slidably engaging the crank D' which is connected to the corresponding slide $z$ by a pin and slot similar to that described for the slides S, the slides $z$ being radially guided by a slot embracing the tube $k'$ and a guide pin as described for guiding the slides S, and the crank D' having a toothed collar $m'$ engaging and supporting a toothed ring or gear $n'$ by which the cranks D' and C' may be similarly simultaneously operated for uniformly radially collectively adjusting the slides $q$ and $z$ preferably from externally of and from above the separating chamber to radially vary the space around the baffle V and the space around the throat baffle $y$, to vary outflow of current from the selection chamber P and from the exhaust chamber X.

The cranks D' are shown as supported from the baffle $y$ by being mounted on the slides $z$ thereon, which are radially slidable thereon under said cranks, so that unintentional sliding of these slides is resisted by the weight of these cranks.

In the separator shown the distributor slides S are preferably radially adjusted from without and preferably above the outer casing of the separator and preferably from externally of and above the driving mechanism, preferably by mounting the gear $i'$ on a tubular shaft E' disposed concentrically of and around the supply pipe D and concentrically within and through the drive pipe L and extended above and below and revolving with and preferably movable, oscillatory, or rotative relatively to the latter, and preferably carried on the upper end of the drive pipe L by a collar or wheel F" by turning which the pipe E' can be oscillated relatively to the pipe L to revolve the gear $i'$ and oscillate the cranks $c'$. To resist unintentional oscillation of the pipe E' on the pipe L a suitable lock is preferably provided between them, that shown consisting of notches H' on the end of the pipe engaged by teeth $o'$ on the collar F", for holding these pipes against accidental relative rotation but permitting their relative adjustment by applying sufficient force to lift the tooth $o'$ over a notch H'.

In the separator shown I preferably vertically adjust the distributor E and its radially adjustable plates and its hub $g$ and its inward deflector baffle T collectively and simultaneously and preferably from without and above the outer casing and drive mechanism, preferably by carrying these parts on the pipe E' and adjustably suspending this pipe from above, preferably by providing the upper end of the pipe with a screw thread $p'$ and screw threading the collar F" and adjustably screwing it on the pipe, whereby unscrewing the collar causes the pipe E' and the parts carried by it to be lowered from its uppermost position shown to a lower position to suit the requirements of the material being separated, after which the collar may be set on the pipe by its set screw $q'$ to prevent loss of this adjustment. To hold the pipe E' against rotation while the collar F" is being screwed along the pipe I preferably provide the pipe with one or more notches I' in which a tool may be inserted to resist its rotation. The upper end of the pipe E' is preferably enclosed by a cover J' carrying the feed pipe D and resting on the gear case $m$ for enclosing the upper bearing $j$, which cover has one or more apertures $r'$ affording access to the collar F", and a removable ring or other cover $s'$ for closing such aperture or apertures. The distributor and its baffle are preferably non-rotatively slidably connected to the pipe L by a key screw $t'$ sliding in a keyway $u'$ so that these parts will rotate with the shaft but may be adjusted vertically of it, and the weight of these parts is preferably carried from the pipe E' by a lip or flange $v'$ extended under the shoulder $h'$ on the barrel of the crank B'.

In the separator shown preferably both the baffles U and V and the slides $q$ and inclined down beaters W are vertically adjustable, preferably collectively and from externally of the separating chamber, to vertically vary the selection and exhaust chambers and to contract the jet outlet $p$ between the baffle U and the baffle T, and their vertical adjustment is preferably effected from above the throat baffle $y$ as shown by suspending them on the tension bolt $l'$ which rises through the tube $k'$ and has a screw threaded upper end carrying the adjusting nut $w'$ resting on top of the corresponding crank D' by unscrewing which nut the baffles U and V may be lowered from their uppermost positions shown to vary the volume of the selection chamber P or the area of the jet outlet $p$ to permit which the hub $x'$ of the baffle V is preferably fastened on the pipe L by a key screw $y'$ sliding in a key slot $z'$ in the pipe L so that the hub will rotate with this pipe while being vertically adjustable on it. The square pipe $k'$ slides down in the crank D' as the baffle V is lowered, but its square cross sectional shape compels this crank and the crank C' to oscillate together in any position of vertical adjustment of the baffle V.

The throat baffle $y$ mounted on the blower shaft L, and the radially movably adjustable segments $z$ mounted on the baffle $y$, constitute a radially movably adjustable current space variation means adjacent the plane of the upper outlet, and the cranks D', connected to the segments $z$, and being operable to collectively movably adjust them, constitute adjustment means or levers for the latter, mounted above them and below the blower means, and inwardly of and below the outer casing, and above the upper outlet and upper baffle and the distributor, and are preferably carried and revolved by the shaft L.

The hub $x'$, mounted on the shaft L, and the upper baffle V, and the radially slidably adjustable segments $q$ thereon, constitute the upper current space variation means below and adjacent the upper outlet for defining the space through which the current may flow from the separating chamber, and the cranks C', mounted above the baffle V and below the blower means and above the distributor, and connected to the segments q, constitute upper baffle adjustment means or levers operable to collectively radially movably adjust the segments q, and thereby to vary the current space past their outer edges, for varying the velocity of the current, for varying the separation. The levers C' are preferably fulcrumed on and oscillatory about a vertical axis, and in vertically fixed relation to and extended above and oscillatory from above the segments z and from below the blower means, and are preferably carried and revolved by the shaft L and oscillated by and coincidently with the levers D', for coincidently collectively radially movably adjusting the segments q and z preferably in the same direction at the same time.

The movably adjustable segments q and z constitute vertically spaced successive current space variation means, for successively defining the space through which the current may flow, and are movably adjustable respectively for respectively varying such space, for varying the velocity of the current, for varying the separation, and the levers C' and D' with their connection k' constitute coincident adjustment means common to the segments q and z, and operable to coincidently movably adjust each thereof preferably in the same direction at the same time.

When the upper valve V is vertically adjustable as shown, its screw threaded suspension bolt l', screwably engaged by its adjusting nut w', constitutes vertically screwable adjustment means for the upper baffle, mounted on the blower shaft L inwardly of and below the outer casing and below the blower and above the distributor and upper baffle and the segments z, and being operable to vertically movably adjust the upper baffle from said mounting.

The collectively slidably adjustable segments z constitute an upper valve adjacent the upper outlet, which is radially movably adjustable for varying the space through which the current may flow from the separating chamber to the spokeless influent chamber below the valve A', which latter is preferably vertically adjustable relatively to the segments z, whereby the velocity of the current may be varied either as it leaves the separating chamber, or as it enters the blower, and preferably when both such variations are employed by independently effecting each variation.

In the separator shown, I preferably resiliently or vibratorily mount the inner casing B and the tailings cone C, so that these and the filter carried by such casing may vibrate during operation to facilitate flow of material from them, preferably by yieldingly spring mounting the separating chamber on leaf springs a2 between its inclined wall c and its brackets b2, and clamping it against such springs by loose bolts c2 so that it may compress the springs and be abruptly arrested by the bolts as the springs expand for radially and upwardly jarring the separating chamber, and preferably by clamping the tailings cone C on its brackets d2 by springs e2 reacting against bolts f2 to hold the cone against the brackets but permitted it to be raised therefrom and then abruptly arrested as the spring returns it to the bracket.

In the separator shown, I preferably provide continuously revoluble speed reducer means, and revoluble strikers swinging on a revoluble horizontal axis, for power jarring intermittently and at low frequency the separating chamber and filter and tailings cone by revoluble gravity or centrifugally swung strikers preferably above the outer casing and above the blower and operatively connected to the sub-blower internal parts by an anvil jarrer without and around and extended above and past and below the outer edges of the fan blades and intermediate the wall of the outer casing and the walls of the inner parts, for intermittently impactively jarring or vibrating these from the continuously revoluble speed reducer and revoluble striker upper external parts. Preferably I provide a speed reducer L' preferably consisting of any continuous rotation speed reduction train of driving and driven gearing wheels and a revolving hammer revolved by such gearing and swinging on a continuously revoluble and preferably horizontal axis and preferably falling by gravity to strike an impactive jarring blow on the anvil jarrer. Preferably the continuously revoluble speed reducer shown is partly gear driver and partly belt or tractionally driven and in the construction shown its tractionally driven part preferably consists of a small V belt wheel g2 on the drive shaft belted to a large pulley h2 on one end of the bracket i2 and having a small pulley j2 belted across the shaft to a large pulley k2 on the other end of the bearing bracket i2 and having a small pulley l2 belted to a large pulley m2 revolubly mounted on the shaft G and carrying a revoluble and swinging gravity striker n2 lifted by a pin o2 and swinging by gravity from at a certain point in its revolution and then impactively striking the head of an anvil jarrer p2 sustained by a spring q2 and depended into the space between the inner and outer casings and connected to a contracting toggle link r2 for flexing this to radially stress the inner casing slightly when the jarrer descends and connected to a swinging gravity impact hammer s2 for swinging this against the filter M when the jarrer descends and connected to an expansion toggle t2 for straightening this to radially press the tailings cone when the toggle descends.

Preferably the top wall of the casing A is made of half segments, and the jarrer p2 is located in juxtaposition to the striker n2 near the end of one segment and diametrically opposite this in corresponding position near the end of the other segment, and the jarrers are duplicated and timed to act preferably simultaneously as by extending the shaft u2 of the wheel k2 across the top to the other bracket i2 and mounting on it a small gear pinion v2 meshing with a large gear hammer wheel w2 for driving the latter in reverse direction to the first hammer pulley m2, which pulley w2 is equipped with a hammer or striker n2 and a pin o2 similar to those before described for striking the diametrically opposite jarrer p2.

One or more of any desired hand holes z2 may be provided for access, adjustment, and removal of the internal parts. The parts adjacent the uppermost hole can conveniently be adjusted through that, and the lower adjustable parts can be more conveniently adjusted by the wheel F''. Any usual or separable sectional construction may be employed for separably or removably or adjustably connecting the various parts, and their relative proportions and relation may be varied to suit material to be separated or the conditions under which separation is to be effected, and any corrosion or abrasion resistant material or treatment may be employed in their construction or assembly to protect them from wear or destruction by abrasive or corrosive materials.

In operation with the preferred combination and form of my improvements shown as constituting the preferred form of my invention, the drive will revolve the shafts L and E' to revolve the distributor and baffle walls and the fan blades of the blower will cause a separating current to rise in a continuous path through the separating chamber and outflow through the upper outlet and through the spokeless space under the suspended valve A' into the settling chamber through which it will descend and from which it will pass through the filter M and return through the inlet J. Material to be fed will descend through the non-rotary feed pipe D on to the distributor E by which it will be centrifugally projected across the separating current in the distribution chamber Q, radially adjustably intermediate of which it will be uptossed toward the inward deflector T, which will intercept large particles and deflect the current laterally away from the outer periphery of the baffle V. The radial width of the distributor space and of the space through which current may enter and leave the distribution chamber Q will be varied preferably from externally of the distribution chamber by radially adjusting the plates S above and below this chamber. The space through which the current may enter the inlet J will be radially varied from without the outer casing by vertically adjusting the valve R movably suspended in this inlet. The current rising under the baffle U will be downwardly and outwardly jetted into the lower part of the selection chamber P in which it will rise and expand under the baffle V, and from the outer portion of which it will escape around the preferably radially adjustable outer periphery of the baffle V, the outlet r around which will be radially adjusted by adjusting the plates q, and the size of the fines passing through the outlet r will be determined by oscillating the pivoted down-beaters W to suit their angularity to that best for beating down particles larger than should escape from the selection chamber. Current rising through the outlet r will circulate inwardly in the exhaust chamber X and be deflected downwardly by its annular baffle u and curved upwardly directly toward the outlet K. Particles floating in such current entering the outlet K will be mechanically out-beaten under and adjacent the top wall a by the narrow vertical rotary outbeaters Y, and will be thrown into the grit well Z and slide down its inclined bottom wall t and through the grit duct w on to the outer wall c of the separating chamber and pass down this wall between and around the periphery of the baffle T and down the outer part of the distribution chamber and escape through the bottom opening J, falling across the return current to afford an opportunity for the latter to infloat any fines contained in such particles and permit oversize to drop on to the inlet valve R and slide down that to the tailings cone C. The size of the outlet K will be varied by radially varying its inner side by radially adjusting the sliding plates z, and the area of the spokeless influent chamber above the outlet K and inwardly of the fan blades will be vertically varied by vertically adjusting the suspended rotary valve A' from above such valve, which will reduce the effective height of the fan blades and correspondingly reduce the force of the separating current, without whirling such current inwardly of such blades.

The vertical position of the distribution chamber will be varied by preferably collectively vertically adjusting the distributor and the baffle T, and the vertical area of the jet p will be varied by vertically adjusting the deflector U, and the vertical area of the selection chamber P will be vertically varied preferably by vertically adjusting the inward deflector T and by reversely vertically adjusting the baffle V, which will correspondingly vertically vary the area of the exhaust chamber.

Vertical adjustment of the baffle V and of the valve A' will be effected through the top hand hole, and radial adjustment of the slides z will be effected from above them through this hand hole, or by reaching in through one of the usual side hand holes in the outer casing to screw down the nut w' for lowering the baffle V and the downward deflector U, or to adjust any crank C' or D' for individually radially adjusting its slide, or to rotate the rack n' for collectively simultaneously oscillating the levers C' and D', for radially adjusting the slides q and z.

Both radial and vertical adjustment of the distributor will be effected from above the outer casing by screwing the hand wheel or nut F' upwardly on the dependent suspender and adjuster pipe E' to lower the distributor, and by rotating the such pipe by turning it and its hand wheel relatively to the tubular shaft L to oscillate the cranks B' to radially vary the slides S. The uptossers K' will be radially and angularly adjusted to adapt them to the position of the radial slides S and to properly toss the material toward or against the baffle T for sufficiently agitating the material to permit the separating current to float the desired fines from it.

The speed reducer will continuously revolve the axis of the striker, and will be suited to reduce the high speed of the drive shaft to such low speed as is desired for revolving the revoluable intermittent striker either to make it act centrifugally in intermittently striking or just enough to attain its intermittently dropping by gravity in striking the anvil jarrers, which will throw their toggles below and push the separating chamber and tailings cone radially against the action of their retaining springs, and will swing the gravity hammer radially toward the filter, for intermittently vibratorily effecting these parts.

All adjustable parts being in the retracted positions as shown they will be respectively adjusted from these positions to those best suited to separation of the particular material being operated on.

It will be understood that my invention provides improvements which can be variously and advantageously availed of in whole or in part, and it will be understood that the invention is not limited to the particular details of construction, arrangement, or combination of elements, set forth as constituting its preferred form, since it can be availed of in whole or in part according to such equivalents, modifications, or arrangements, or combination of parts, as circumstances or the judgment of those skilled in the art may dictate, without departing from the spirit of the invention.

One such modification consists in removing the collective adjustment rack n' from operative relation to the cranks C' and D' for permitting individual adjustment of the latter and their slides.

It will be understood that where collective adjustment or outside manipulation of the radially variable segments for the baffles or any of them is not required any simple detachable and adjustable segments may be used instead of the slidable and oscillating and rotary features described as preferable for collective adjustment or outside manipulation of such segments, and that my invention can be availed of by any simple construction which will afford outward radial adjustment of the air passage from the distribution chamber to the selection chamber or from the selection chamber to the outlet, or from the exhaust chamber to the blower, or vertical adjustment of a spokeless influent chamber inwardly of the blower, and that it can be availed of with any speed reducer gearing for revolving any gravity swinging striker revoluble around and swingable on a revoluble horizontal axis for transmitting its impact to the sub-blower internal parts.

Grit descending through the duct w slides down the wall c and escapes through the grit space x around the baffle T.

When it is desired to jar the top wall this may be done by a swinging hammer as M', and when it is desired to jar the outside wall this is done by a swinging hammer as N', both being operated by the anvil jarrer rod $p2$.

Although for the purpose of more fully illustrating the applicability of that part of my original invention which is claimed herein I have shown and described it in connection with that part of my original invention comprising a lower distributor and a lower baffle each of which comprises a rotary ring of collectively radially slidably adjustable segments, such a lower distributor and lower baffle are not claimed herein, being claimed in my companion application Serial No. 714,961 filed March 10, 1934 as a continuation in part hereof.

What I claim is:

1. In combination, in a separator, an outer casing enclosing a settling chamber, an inner casing within and in spaced relation to said outer casing and enclosing a separating chamber having a lower current inlet and an upper current outlet in communication with said settling chamber and affording an endless current passage up through and down around said inner casing, supply means for supplying material to be separated in said separating chamber, blower means for causing a fluid current to flow up through said separating chamber and circulate through said passage to separate and float fine material into said settling chamber, a rotary distributor in said separating chamber for distributing such material therein, rotary beater means within said separating chamber, spaced above said distributor and rotatable in the path of said current for beating from the latter particles upfloating therein, and a rotary upwardly and inwardly extended annular baffle within said separating chamber and above said distributor, having a lower outer periphery outwardly of and spaced above said distributor and below said beater means and in the path of such current, and having an upper inner periphery disposed a substantial distance inwardly and above said outer periphery and spaced a substantial distance from and above said distributor, and affording within said inner periphery an inner upward current passage in communication from above said distributor with an inner portion of said separating chamber, for inwardly deflecting such current above said distributor and for upwardly passing such current below and into an inner portion of such separating chamber below said beater means, and constructed and arranged to below the latter intercept large particles floating in such current.

2. In combination, in a separator, an outer casing enclosing a settling chamber, an inner casing within and in spaced relation to said outer casing and enclosing a separating chamber having a lower distribution portion and an upper selection portion, and having a lower current inlet and an upper current outlet in communication with said settling chamber and affording an endless current passage up through and down around said inner casing, supply means for supplying material to be separated in said separating chamber, blower means for causing a fluid current to flow up through said separating chamber and circulate through said passage to separate and float fine material into said settling chamber, a rotary distributor in said lower distribution portion of said separating chamber for distributing such material therein, and for defining around said distributor an upward passage for said current, rotary material uptossers in said distribution portion and around said distributor, and rotatable in said upward passage and in the zone of said distribution, for uptossing said distributed material toward said selection portion, and a rotary annular wall within said separating chamber, below said selection portion and above said distribution portion, spaced above said distributor and having a periphery spaced from the latter, and extended laterally across said upward passage for laterally deflecting said current and for intercepting said uptossed particles, for passing said deflected current from said distribution portion below and into said selection portion, and rotary for rotatably discharging said intercepted particles below said selection portion, disposed opposite and above said uptossers, and constructed and arranged to rotatably intercept and discharge thereabove material uptossed therefrom.

3. In combination, in a separator, an outer casing enclosing a settling chamber, an inner casing within and in spaced relation to said outer casing and enclosing a separating chamber having a lower current inlet and an upper current outlet in communication with said settling chamber and affording an endless current passage up through and down around said inner casing, supply means for supplying material to be separated in said separating chamber, blower means for causing a fluid current to flow up through said separating chamber and circulate through said passage to separate and float fine material into said settling chamber, a rotary distributor in said separating chamber for distributing such material therein, a rotary ring of material uptossers within said separating chamber and around said distributor, rotatable in the zone of said distribution, for uptossing said material around said distributor, an annular baffle wall within said separating chamber, spaced below said outlet and above said distributor and a material distance above said uptossers, in the path of said current above the latter, for defining said path thereabove through which said current may flow past said baffle wall, comprising a ring of segmental plates concentric of and above said uptossers, said plates being radially slidable relatively to said uptossers, for varying said path and separation above the latter, and adjustment means in operative relation to said plates adapted to radially slide the latter above and relatively to said up-tossers.

4. In a separator comprising, a casing enclosing a current passage, a casing having an outer wall enclosing a separating chamber having a lower current inlet and an upward current passage and an upper current outlet in communication with said passage, supply means in communication with said upward passage, blower means for causing a fluid current to upflow through said upward passage, and distribution means within said upward passage, having an outer periphery spaced concentrically therein; the combination therewith of a ring of circumferentially spaced means within said separating chamber, rotatable in the space around the periphery of said distribution means, for up-tossing material therearound, spaced a distance from said wall, and adjustable radially of and toward and from said periphery, and means for radially adjusting said uptosser means between and relatively to said periphery and said wall, to vary the distance therebetween of said up-tossing means.

5. In a separator comprising, a casing enclosing a current passage, a casing having an outer wall enclosing a separating chamber having a lower current inlet and an upward current passage and an upper current outlet in communication with said passage, supply means in communication with said upward passage, blower means in communication with said upward passage, for the upflow of a fluid current therethrough, distribution means within said separating chamber, having an outer periphery spaced concentrically inwardly from said wall, and a rotary ring of circumferentially spaced uptosser means within said separating chamber and spaced between and concentrically of and rotatable in the space between said wall and said periphery, for uptossing said material in said space; the combination therewith of means for radially varying the width of said space, comprising a rotary ring of radially slidable segments within said separating chamber, having outer edges concentrically inwardly of and adjacent said uptosser means, and means for radially sliding said segments within said space and toward and from said uptosser means.

6. In a separator comprising, a casing enclosing a current passage, a casing enclosing a separating chamber having a lower current inlet and having a wall around and enclosing an upward current passage and an upper current outlet in communication with said passage, supply means having an orifice a material distance below said outlet and within said upward passage, blower means in communication with said upward passage, distribution means below said orifice and within said upward passage, and a rotary ring of particle beaters within said separating chamber, spaced below said outlet and a material distance above said orifice, and extended between said wall and said supply means substantially radially across and rotatable within said upward passage, said beaters having therebetween upward current passages for uppassing said current between said beaters during said beating; the combination therewith of means for radially varying the effective size of said upward current passages, comprising a rotary ring of radially slidable segments inwardly of and adjacent and extended across said upward current passages between said beaters, and means for radially sliding said segments relatively to said beaters and across said upward current passages.

7. In a separator comprising, a casing enclosing a current passage, a casing having a wall enclosing a separating chamber having a lower current inlet and an upward current passage and an upper current outlet in communication with said passage, supply means in communication with said upward passage, blower means in communication with said upward passage, distribution means spaced below said outlet and within said upward passage, a baffle wall within said separating chamber and below and adjacent said upper outlet, having an outer periphery spaced concentrically inwardly from said wall, and a rotary ring of circumferentially spaced particle beaters around and concentric of said periphery and extended from the latter toward said wall substantially radially across and rotatable in the space therebetween, said beaters having between them upward current passages; the combination therewith of means above and for radially varying the effective size of said upward current passages, comprising a ring of radially slidable segments concentrically inwardly of said beaters and adjacent and circumferentially extended across and radially slidable over said current passages therebetween, and means for radially sliding said segments relatively to said beaters and toward and from said wall over and across said passages.

8. In a separator comprising, a casing enclosing a current passage, a casing enclosing a separating chamber having a lower current inlet and an upward current passage and an upper current outlet in communication with said upward passage, supply means in communication with said upward passage, blower means in communication with said upward passage, distribution means spaced below said outlet and within said upward passage, and a rotary ring of circumferentially spaced particle beaters adjacent the plane of and extended substantially radially across said outlet and rotatable across the path of said current upflowing therethrough, said beaters having between them circumferentially spaced upward current passages; the combination therewith of means above said beaters for radially varying the effective width of the zone of said beating, comprising a rotary ring of radially slidable segments adjacent and above and inwardly of and encircled by said beaters, and having outer edges spaced inwardly of said outlet and adjacent said beaters and circumferentially extended across and radially slidable over said upward current passages therebetween, and means for radially sliding said segments relatively to said beaters and radially across said passages therebetween.

9. In a separator comprising, a casing enclosing a current passage, a casing having an outer wall enclosing a separating chamber having a lower current inlet and an upward current passage and an upper current outlet in communication with said passage, supply means in communication with said upward passage, blower means in communication with said upward passage, distribution means spaced below said outlet and within said upward passage, and a rotary ring of circumferentially spaced particle outbeaters disposed within said separating chamber below said outlet and above said distribution means, having outer ends radially extended toward said wall, said outbeaters having between them upward current passages; the combination therewith of an outbeaten particle sustainer transversely extended annular wall outwardly extended above said distribution means and having an inner periphery around said upward passage and below and adjacent and inwardly of said outer ends of said outbeaters, and constructed and arranged to below said outbeaters receive said particles, and to outwardly of and around said periphery and above said distribution means sustain said particles without molestation of said particles by said upflowing current.

10. In a separator comprising, a casing enclosing a current passage, a casing having an outer wall enclosing a separating chamber having a lower current inlet and an upward current passage and an upper current outlet in communication with said passage, supply means in communication with said upward passage, blower means in communication with said upward passage, distribution means spaced below said outlet and within said upward passage, and a rotary ring of circumferentially spaced particle outbeaters disposed within said separating chamber below said outlet and above said distribution means, having outer ends radially outwardly extended toward said wall, said outbeaters having between them upward current passages; the combination therewith of an annular transverse outwardly extended partition wall within said separating chamber, above said distribution means and around said upward passage and below and adjacent said outbeaters, having an inner periphery around said upward passage inwardly of and below the outer ends of said outbeaters, and transversely outwardly extended from said periphery across said upward passage outwardly thereof, and above said distribution means and below said outer ends, and constructed and arrangd to partition said upflowing current from said outer ends, and to provide below the latter and above said partition wall a quiescent zone for receiving said particles outbeaten by said outbeaters, for preventing molestation of said outbeaten particles by said upflowing current.

11. In a separator comprising, a casing enclosing a current passage, a casing having an outer wall enclosing a separating chamber having a lower current inlet and an upward current passage and an upper current outlet in communication with said upward passage, supply means in communication with said upward passage, blower means in communication with said upward passage, distribution means spaced below said outlet and within said upward passage, and a rotary ring of circumferentially spaced particle outbeaters disposed within said separating chamber below said outlet and above said distribution means, having outer ends radially outwardly extended toward said wall, said outbeaters having between them upward current passages; the combination therewith of a transverse and outwardly extended outbeaten particle conductor annular wall within said separating chamber and below said outbeaters and above said distribution means and around said upward passage, having an inner periphery inwardly of said outer ends and above said distribution means and below and adjacent said outbeaters, and transversely outwardly extended from said periphery across said passage outwardly thereof, and above said distribution means and below said outer ends, and constructed and arranged outwardly of said periphery and above said distribution means and below said outer ends to receive from and outwardly conduct below said outbeaters and above said distribution means said particles outbeaten by said outbeaters above and around said periphery.

12. In a separator comprising, a casing enclosing a current passage, a casing having an outer wall enclosing a separating chamber having a lower current inlet and an upward current passage and an upper current outlet in communication with said passage, supply means in communication with said upward passage, blower means in communication with said upward passage, distribution means spaced below said outlet and within said upward passage, and a rotary ring of circumferentially spaced particle outbeaters disposed within said separating chamber below said outlet and above said distribution means, having outer ends radially outwardly extended toward said wall, said outbeaters having between them upward current passages; the combination therewith of means within said separating chamber, comprising a transverse, outwardly and downwardly extended, annular wall below said outbeaters and above said distribution means and around said upward passage, having an inner periphery around said upward passage and inwardly of said outer ends and above said distribution means and below and adjacent said outbeaters, transversely outwardly and downwardly extended from said periphery across and around said upward passage outwardly thereof, and above said distribution means and below said outer ends, and constructed and arranged to receive and outwardly and downwardly convey said particles below said outbeaters and above said distribution means and across and around said upward passage, and to outwardly and downwardly convey said particles across and around said upflowing current.

13. In a separator comprising, a casing enclosing a current passage, a casing enclosing a separating chamber having a lower current inlet and an upward current passage and an upper current outlet in communication with said passage and having a top wall in the plane of and having an inner periphery around and outwardly defining said outlet, supply means in communication with said upward passage, blower means in communication with said upward passage for the upflow of a fluid current therethrough, for the separation of said material therein, and distribution means spaced below said outlet and within said upward passage; the combination therewith of a rotary ring of radially slidable flat segments above said separating chamber and in said plane and spaced concentrically inwardly of said periphery, having outer edges spaced inwardly from said periphery, means for rotating said ring, and rotary radial adjustment means above said separating chamber and inwardly of said outlet and said edges, for radially slidably adjusting said segments a variable distance across said outlet.

14. In a separator comprising, a casing enclosing a current passage, a casing enclosing a separating chamber having a lower current inlet and an upward current passage and an upper current outlet in communication with said passage, supply means in communication with said upward passage, rotary blower means comprising spoke means extended across and spaced above said outlet, and fan blades above and having inner edges around said outlet and depended from their upper edges from said spoke means, distribution means below said outlet and within said upward passage, and a rotary outwardly extended valve inwardly of said blades and opposite and above said outlet for defining below said valve the space through which said current may flow from said outlet to said blades, and vertically adjustable; the combination therewith of adjustment means in operative relation to said rotary valve, disposed inwardly of and above the inner periphery of said outlet, mounted above the latter and above said valve, depended from said spoke means, and constructed and arranged to vertically adjustably depend said valve below and from said spoke means without molestation of said current upflowing below said valve from said outlet to said blades, and to afford a relatively spokeless influent chamber below said valve and inwardly of said blades.

15. In a separator comprising, a casing enclosing a current passage, a casing enclosing a separating chamber having a lower current inlet and an upward current passage and an upper current outlet in communication with said passage, supply means in communication with said upward passage, rotary blower means comprising spoke means extended above said outlet, and fan blades having inner edges above and around said outlet and upper edges depended from said spoke means, distribution means below said outlet and within said upward passage, and a rotary valve above said outlet and encircled by said blades, for defining the space through which said current may upflow from said outlet to said blades, and vertically adjustable for varying said space, said spoke means being disposed approximately the height of said blades above said outlet, and above and extended over and rotatable with said vertically adjustable valve, and said valve being between said spoke means and said outlet, and isolating said spoke means from the space below said valve between said outlet and said edges; the combination therewith of rotary suspension screwable adjustment means in operative relation to said valve, mounted on said spoke means above said valve and depended from said spoke means to and into adjustable operative relation with said valve, screwably connected to said valve, and constructed and arranged to suspend and vertically adjust said valve below said spoke means from above said valve without molestation of said current flowing below said valve from said outlet to said blades.

GEORGE HOLT FRASER.